Dec. 9, 1947.  A. J. EGGLESTON  2,432,299
METHOD OF MAKING A KITCHEN TOOL
Filed Dec. 29, 1945
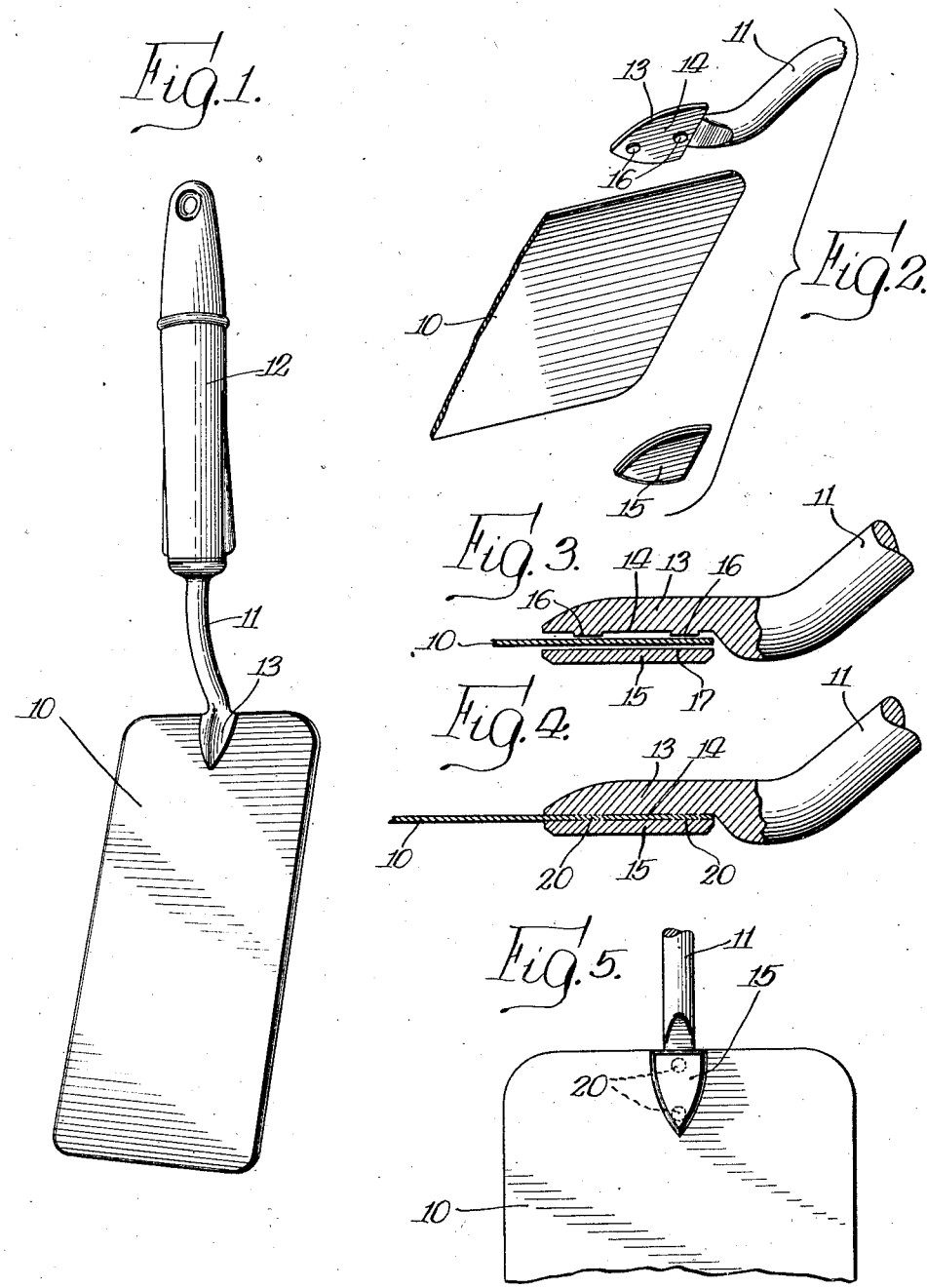
INVENTOR.
Allen J. Eggleston,
BY
Davis, Lindsey, Smith & Shonts
Attys.

Patented Dec. 9, 1947

2,432,299

UNITED STATES PATENT OFFICE 2,432,299

METHOD OF MAKING KITCHEN TOOLS

Allen J. Eggleston, Chicago, Ill., assignor to Ekco Products Company, Chicago, Ill., a corporation of Illinois Application December 29, 1945, Serial No. 638,005

2 Claims. (Cl. 76—113)

The invention relates generally to making kitchen tools and more particularly to a kitchen tool having a spring steel blade.

The general object of the invention is to provide a kitchen tool of the type having a spring steel blade, such as a spatula, cake turner, pie server or the like, or novel construction permitting welding of the blade to a steel stalk or shank of a handle, without rendering the steel in the blade brittle at the point of weld.

Another object is to provide a novel method of making a kitchen tool of the foregoing character, which permits welding the spring steel blade to the steel stalk of a handle without necessitating an annealing operation, after the welding.

A further object is to provide a novel method of making a kitchen tool of the foregoing character, which includes the step of welding the spring steel blade to the steel stalk in such a way that it avoids rendering the steel in the blade adjoining the weld excessively brittle.

Other objects and advantages will become apparent from the following description taken in connection with the accompanying drawings, in which:

Figure 1 is a perspective view of a kitchen tool embodying the features and made in accordance with the method of the invention.

Fig. 2 is a fragmentary perspective view showing parts of the tool prior to assembly.

Fig. 3 is a fragmentary sectional view showing the parts ready for welding.

Fig. 4 is a view similar to Fig. 3 but showing the parts after welding.

Fig. 5 is a fragmentary view showing a rear view of the tool.

The present invention relates to a kitchen tool of the type comprising a spring steel blade extending from a handle. A number of different specific forms of such a tool are made, for example, a spatula, a cake turner, pie server and others. While all of these tools have the common characteristic of comprising a spring blade secured to a handle, the particular form of the blade and the particular relation of the handle thereto may vary with the different specific forms. A tool of the type herein contemplated comprises the spring steel blade secured to the steel shank or stalk of the handle, the latter extending from one end of the blade either in the plane thereof or at an angle thereto.

In manufacturing a tool of this character, the blade is preferably secured to the stalk by welding, if such welding can be performed without weakening the blade at the point at which it is secured to the stalk. The stalk is usually made of a mild steel which can be readily welded, but the blade, being made of a spring steel, is more difficult to weld because of the composition of the steel by which the resilience is imparted. In fact, the difficulty heretofore encountered in attempting to weld a blade of this character to the stalk has been so great that riveting of the two parts together has been resorted to in place of welding.

If the steel of the blade is so heat treated or tempered as to give the blade its desired resilience prior to assembly of the parts, the welding of the blade to the stalk tends to result in a brittleness of the blade at the point of welding. Such brittleness may be so great that the blade can readily be broken away from the stalk at that point. The brittleness resulting from the weld could, of course, be eliminated by an annealing operation, but that would result in drawing the temper of the blade in the unwelded areas so that the blade would not have the desired resilience. It is, of course, desirable to be able to utilize a steel for the blade, which is tempered at the mill to avoid the necessity of any heat treatment or the like after it is given its blade form.

The present invention provides a kitchen tool of the foregoing type, and a method of making it, which permits purchasing mill tempered stock and forming the blade therefrom as by a punching process. The stalk is made from a mild steel and is provided with a head portion having a surface adapted to be placed in face to face relation with one side of the blade and to be welded thereto. If the opposite side of the blade were exposed to the air at the conclusion of the welding operation, the cooling of the blade would be too rapid and the welded portion of the blade would thereby be rendered excessively brittle. While the head portion is of sufficient bulk to retain a substantial amount of heat adjacent one side of the blade, exposure of the other side would permit such rapid cooling of the blade.

To prevent such rapid cooling, I provide a shield in the form of a pad or the like, which has sufficient bulk to retain the heat similarly to the manner in which heat is retained by the head portion of the stalk. In welding the parts together, the head portion is placed against one side of the blade, while the pad is placed against the other side, and the three pieces are welded together. The welded portion of the blade is thus covered on both sides by means having sufficient heat retaining capacity to prevent the rapid cooling of the welded portion of the blade. The excessive brittleness resulting from such rapid cooling is thereby avoided.

A tool of the type herein contemplated is illustrated in Fig. 1. It comprises a relatively thin steel blade 10 to which is secured, by welding, a stalk 11 supporting a handle 12. The blade is made of a spring steel, preferably stainless, mill tempered to give it the desired resilience. In the present form, the blade is generally rectangular in form, as will be noted.

The stalk 11 has one end formed so that it may be rigidly secured to the handle 12, while at its other end it is formed into a head portion 13 for welding to one side or face of the blade 10. In the present instance, the head portion 13 has an arrowhead shape and is provided with a flat surface 14 adapted to lie in face-to-face relation with the blade. It will be noted that the head portion 13, because of its greater thickness than the blade, has sufficient bulk to retain heat from a welding operation.

As heretofore mentioned, if the head 13 were welded directly to the blade without any heat retaining means being placed on the opposite side of the blade, such opposite side would be exposed to the air at the conclusion of the welding operation. Such exposure to the air would result in rapid cooling of the welded portion of the blade and consequent brittleness thereof. To avoid this difficulty, I provide a pad 15 of sufficient thickness to provide a bulk of metal having substantial heat retaining capacity. The pad 15 is preferably shaped similarly to the head 13 and is placed in alignment with the head portion 13 at the opposite side of the blade. The blade is thus held between the head portion 13 and the pad 15 so that the welded portion of the blade is not exposed to the air after the welding operation. The heat retained by the head portion 13 and the pad 15 thus slow down the rate of cooling of the blade sufficiently to prevent it from becoming excessively brittle. At the same time, the rate of cooling is such that the blade will not be rendered unduly soft.

In welding operations of this character, it is desirable to limit the weld to relatively small areas to avoid the necessity of using an excessive amount of electric current to bring the parts up to welding temperature at the point of weld. Preferably, the means for limiting the welding to relatively small areas comprises, in the present instance, a pair of bosses 16 formed on the blade-abutting surface of either the head portion 13 or the pad 15. In this instance, the bosses 16 are formed on the head portion 13 since they may then be formed as an incident to the formation of the head portion 13 on the stalk 11. With means such as the heat concentrating bosses 16 formed on either head portion 13 or the pad 15, no such means need be formed on the other of these two members since the thinness of the blade permits the heat to be conducted therethrough to provide for a welding action at the face of the blade opposite to that contacted by the bosses 16. Thus, in the present instance, the pad 15 is provided with a flat surface 17 adapted to abut directly against the blade without any heat concentrating bosses formed thereon. When the head portion 13, pad 15 and the blade are welded together, all three members will be welded in the areas substantially defined by the bosses 16, as indicated at 20 in Figs. 4 and 5.

A further advantage is derived from utilizing means such as the bosses 16 which are of much smaller size than and lie within the area of the head portion 13, that is, spaced inwardly from the edges of the head and pad. The welding operation tends to create a slight scale in the vicinity of the welded portion, particularly on the blade. If the welded portion of the blade were close to the edges of the head portion 13 and pad 15, the scaling would cause a discoloration of the metal of the blade, and such discoloration would be exposed to view. Such discoloration would, of course, be undesirable from the appearance standpoint. However, by forming the bosses 16 well within the area of the surface 14 of the head portion 13, the discolored area of the blade is completely covered on the one side by the head portion and on the other side by the pad 15 so that the polish originally given to the blade before assembly will remain on all the exposed portions thereof. The concentration of the heat in the bosses 16 also assists in preventing brittleness of the exposed portion of the blade, since the exposed portion of the blade is spaced from the heated portion thereof by the spacing of the bosses 16 from the edges of the head and pad.

From the foregoing, it will be apparent that I have provided a novel tool as well as a novel method of manufacturing a tool of the general character herein disclosed. The invention permits making a tool having a spring steel blade which may be brought to the proper temper before securing the blade to its handle. The blade is secured to the stalk of the handle by welding so that a rigid connection is formed therebetween. By shielding the welded portion of the blade from exposure to the air at the conclusion of the welding operation by means having sufficient bulk to retain heat and thereby slow down the rate of cooling from the welding temperature, the blade is prevented from becoming excessively brittle. Moreover, the welding process avoids any undesirable discoloration from heat of the exposed portion of the blade, since the blade is enclosed or covered by the head portion of the stalk and by the pad throughout a substantially greater area than the welded portion. A tool in which the stalk is rigidly secured to the blade and the blade is maintained in properly tempered condition is thereby obtained.

I claim:

1. The method of making a kitchen tool comprising a thin spring steel blade and a mild steel stalk, which comprises forming a head portion on the stalk substantially thicker than the blade with a surface thereon having one or more heat concentrating bosses of substantially less area than said surface and spaced inwardly from the edges of said surface, providing a mild steel pad substantially thicker than the blade and having a surface adapted to contact the blade, placing the blade between said surfaces, and electric resistance welding the blade to said bosses and to the areas of said pad opposite said bosses, said head portion and said pad retaining heat from the weld at the welded portion of the blade to prevent rapid cooling and consequent brittleness thereof, and the spacing of said bosses from the edges of said surface preventing heating of the blade outside of said surface.

2. The method of making a kitchen tool comprising a thin spring steel blade and a mild steel stalk, which comprises forming a head portion on said stalk of substantially greater thickness than the blade and having a surface adapted to be positioned in face-to-face relation with the blade, providing a mild steel pad of substantially greater thickness than the blade and having a surface adapted to be positioned in face-to-face relation with the blade, forming heat concentrating means on one of said surfaces spaced inwardly from the edges of said one surface, placing said surfaces in facing relation with the blade clamped therebetween, and electric resistance welding the blade to said means and to an area on the other of said surfaces opposite said means, said head portion and said pad retaining heat from the weld at the welded portion of the blade to prevent rapid cooling and consequent brittleness thereof, and the spacing of said means from the edges of said one surface preventing heating of the blade outside of said surfaces.

ALLEN J. EGGLESTON.

REFERENCES CITED

The following references are of record in the file of this patent:

UNITED STATES PATENTS

| Number | Name | Date |
|---|---|---|
| 208,258 | Myers | Sept. 24, 1878 |
| 779,547 | Judd | Jan. 10, 1905 |
| 904,540 | Lachman | Nov. 24, 1908 |
| 979,970 | Lachman | Dec. 27, 1910 |
| 1,055,261 | Ellinger | Mar. 4, 1913 |
| 1,803,006 | Davis | Apr. 28, 1931 |